Figure 1:
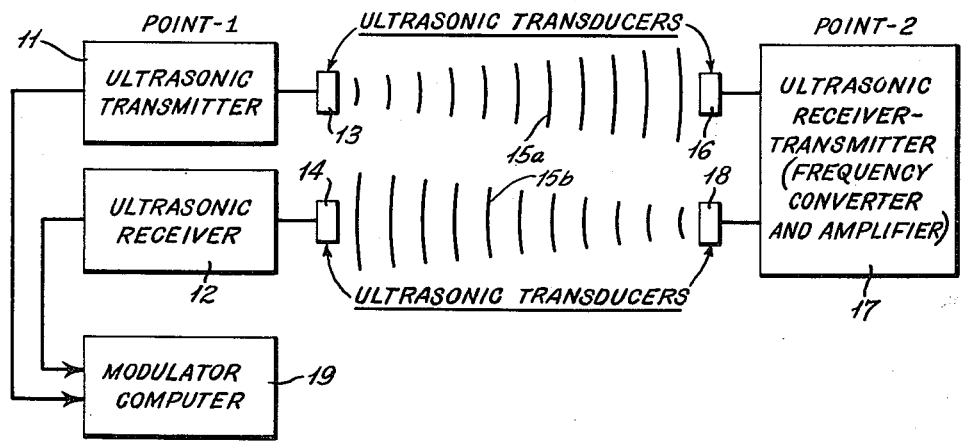

Feb. 5, 1963   C. M. ALSABROOK   3,076,519
ULTRASONIC SURVEYOR'S DISTANCE MEASURING INSTRUMENT
Filed Dec. 18, 1958

INVENTOR
Charles M. Alsabrook

BY
Stevens, Davis, Miller & Mosher
ATTORNEYS

3,076,519
ULTRASONIC SURVEYOR'S DISTANCE MEASURING INSTRUMENT

Charles M. Alsabrook, Dallas, Tex., assignor to Texas Instruments Incorporated, Dallas, Tex., a corporation of Delaware
Filed Dec. 18, 1958, Ser. No. 781,270
2 Claims. (Cl. 181—.5)

The present invention relates to a distance measuring system and has particular reference to a novel electronic surveyor's distance measuring instrument.

Perhaps the outstanding advantage of the new system resides in the fact that it makes possible certain distance measurements in relatively inaccessible places such as dense forest areas and lakes. With this new system, it is also possible to make long distance measurements that would not be practical by merely having longer surveyors' chains than the conventional 100 foot length used by most surveyors at the present time.

Accordingly, the present invention allows a saving of time in making measurements. Also, there is less likelihood of error resulting from the fewer measurements that are necessary. Furthermore, areas do not have to be cleared in order to take measurements, thereby effecting a further saving of time.

Present methods of surveying using a conventional surveyor's chain produce errors from all sources of from about 1 foot in 2300 feet to about 1 foot in 1000 feet for a normal chaining party. The accuracy varies widely depending on the skill of the individual conducting the survey and the type of terrain over which the survey is made.

Accordingly, it is an object of the present invention to provide a new system for distance measurement in which accuracies comparable to those encountered in normal survey chaining may be equalled or exceeded.

It is a further object of the present invention to provide a novel method of measuring distances electronically wherein the variables of temperature and humidity are taken into account to increase the accuracy of the measurements obtainable.

It is a still further object of the invention to provide an ultrasonic distance measuring system utilizing a double ultrasonic traversal of the course to be measured, wherein the ultrasonic traversals are at different frequencies thereby eliminating reflection effects.

Basically, the present invention provides a novel and improved method of measuring the distance between two points by measuring the time of travel of sound between the two points and determining the distance by multiplying this time by the speed of sound under the ambient conditions.

Expressed as a formula for acoustics:

Speed of sound = $1052 + 1.106$ F. feet/second where F. equals temperatures in degree Fahrenheit. Changes in barometric pressure do not affect the result because the density varies directly as the pressure and the ratio $p/d$ (where $p$ is pressure and $d$ is density) is constant at constant temperature.

The only other variables are movement of the medium and density due to water vapors. The variable due to movement of the medium, such as is caused by the wind, is cancelled out by having the sound travel across the distance and back again. The variable due to density changes caused by varying amounts of water vapor in the atmosphere is taken care of in the present invention.

Figure 2:
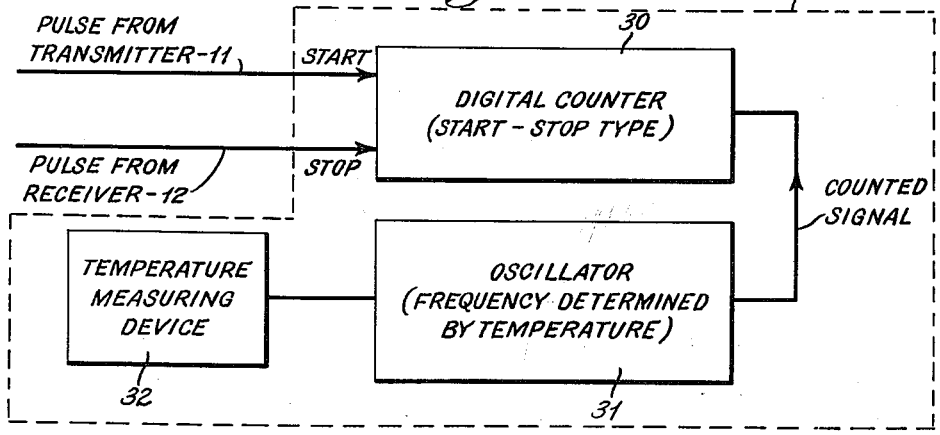

The above, as well as further advantages which are inherent in the invention, will become apparent from the following description, reference being had to the accompanying drawing wherein:

FIGURE 1 is a block diagram of an ultrasonic distance measuring device embodying the principles of the invention; and FIGURE 2 is a block diagram of the modulator-computer of FIGURE 1.

With particular reference now to FIGURE 1, a basic electronic embodiment of the features of the present invention is shown in which an ultrasonic transmitter 11 and an ultrasonic receiver 12 are set up with attached ultrasonic transducers 13 and 14 respectively at station 1. Sound waves 15a are transmitted by ultrasonic transmitter 11 through transducers 13 and 16 to ultrasonic receiver and transmitter combination 17 at station 2. Ultrasonic receiver and transmitter combination 17 at station 2 receives and then frequency converts, amplifies, and transmits the sound waves 15b through transducer 18 back to transducer 14 and ultrasonic receiver 12 at station 1. At station 1, both ultrasonic transmitter 11 and receiver 12 are connected to a modulator-computer 19 that receives information signal from transmitter 11 and receiver 12. Modulator-computer 19 measures the time of travel of the ultrasonic sound waves between stations 1 and 2. The time of travel of sound waves 15 from station 1 to station 2 and back to station 1 is compensated in modulator-computer 19 for the temperature and humidity variations which affect the accuracy of speed measurement of sound waves.

Transmitters 11 and 17 operate at different frequencies in the ultrasonic region. For example, transmitter 11 can operate at 25 kilocycles while transmitter 17 is operating at 30 kilocycles. For simplicity, the elements included in the combination of the transmitter 11 and transducer 13 and the elements included in the transmitting portion of the receiver-transmitter 17 and transducer 18 may be identified as a sonic oscillator actuated "transmitting transducer."

Trees and other obstacles may cause reflections and/or attenuation of the signals, but since the return path is at different frequency, no trouble will be encountered from reflections. All signal reflections arriving at the receivers of this system will occur at a later time than the desired signal.

Modulator-computer 19 contains conventional instruments for measuring the time interval between sound transmission and receiving by transmitter 11 and receiver 12 respectively. Also, it may include available temperature and humidity measuring devices. The combination of this information as discussed above with a correction for relative humidity will readily give the correct distance between stations 1 and 2. Corrections due to relative humidity are in the order of 2.5 feet/sec. for wet air, as compared to zero for dry air. Since the variation is small, in certain geographical areas it can be neglected.

For example, the modulator-computer 19 can consist of a digital counter 30 (electronic) which starts counting when the transmitter 11 is pulsed, and stops counting when the first return pulse is received at the receiver 12. An oscillator 31 drives the counter. The frequency that is to be counted is a set frequency which may be varied slightly as determined by the temperature so that the counter will read directly in feet. The temperature measuring device which compensates the oscillator 31 is designated as 32. Correction for humidity will be done mathematically with the aid of the humidity measuring device and a chart. Even greater accuracy can be obtained if a very accurate fixed frequency is counted by the counter and corrections for temperature and humidity are made mathematically. Also, humidity and temperature measurement devices may be included to modulate the frequency of the oscillator directly so that the counter will give a corrected reading directly in feet.

It will thus be apparent that the new apparatus may be a very useful tool to surveyors in the accomplishment of otherwise difficult surveys. By making full use of miniature components and transistors, the instruments in the present invention can be kept small in their physical size and practical for use in the field.

It should be understood that the specific apparatus shown and described herein is intended to be representative only. Reference should therefore be made to the following claims in determining the full scope of the invention.

The circuitry of the individual blocks of the diagram is of the conventional type well known in the industry, and is not limited to any specific configuration since any of the presently known circuits for the purpose may be used satisfactorily.

What is claimed is:

1. A distance measuring system for operating between a station of origin and a distance station comprising a first transmitting transducer at said station of origin for sending sound waves of a first frequency to said distance station, a first receiving means for detecting said sound waves of said first frequency at said distance station, a second transmitting transducer at said distance station activated responsive to said first receiving means detecting said sound waves at said first frequency to send sound waves at a second frequency back to said station of origin, a second receiving means for detecting said sound waves at said second frequency at said station of origin, an interval counter means operatively associated with said first transmitting transducer and said second receiving means and having a count interval controlled by the total elapse of travel time of said sound waves of said first frequency from said first transmitting transducer to said first receiver and the travel time of said sound waves of said second frequency from said second transmitting transducer to said second receiver, an oscillator operatively associated with said interval counter means to furnish a countable train of pulses to said interval counter means, a temperature compensating device coupled to said oscillator to control the frequency of said train of pulses, a humidity measuring device coupled to said oscillator to control further the frequency of said train of pulses, said interval counter means having read-out means to indicate the distance between said station of origin and said distance station according to said count interval.

2. A distance measuring system for operating between a station of origin and a distance station comprising a first transmitting transducer at said station of origin for sending sound waves of a first frequency to said distance station, a first receiving means for detecting said sound waves of said first frequency at said distance station, a second transmitting transducer at said distance station activated responsive to said first receiving means detecting said sound waves at said first frequency to send sound waves at a second frequency back to said station of origin, a second receiving means for detecting said sound waves at said second frequency at said station of origin, an interval counter means operatively associated with said first transmitting transducer and said second receiving means and having a count interval controlled by the total elapse of travel time of said sound waves of said first frequency from said first transmitting transducer to said first receiver and the travel time of said sound waves of said second frequency from said second transmitting transducer to said second receiver, an oscillator operatively associated with said interval counter means to furnish a countable train of pulses to said interval counter means, a temperature compensating device coupled to said oscillator to control the frequency of said train of pulses, said interval counter means having read-out means to indicate the distance between said station of origin and said distance station according to said count interval.

References Cited in the file of this patent

UNITED STATES PATENTS

| | | |
|---|---|---|
| 2,274,262 | Wolff | Feb. 24, 1942 |
| 2,428,799 | Hayes et al. | Oct. 14, 1947 |
| 2,756,404 | Anderson et al. | July 24, 1956 |
| 2,780,795 | Ambrosio | Feb. 5, 1957 |
| 2,910,665 | Hawkins | Oct. 27, 1959 |